US010307701B2

(12) United States Patent
Klein (10) Patent No.: US 10,307,701 B2
(45) Date of Patent: Jun. 4, 2019

(54) FILTER ELEMENT OF A FILTER, HEATING CAGE FOR A FILTER ELEMENT AND A METHOD FOR PRODUCING A FILTER ELEMENT (71) Applicant: MANN+HUMMEL GMBH, Ludwigsburg (DE)

(72) Inventor: Martin Klein, Ludwigsburg (DE)

(73) Assignee: MANN+HUMMEL GmbH, Ludwigsburg (DE)

(*) Notice: Subject to any disclaimer, the term of this patent is extended or adjusted under 35 U.S.C. 154(b) by 525 days.

(21) Appl. No.: 14/748,665

(22) Filed: Jun. 24, 2015

(65) Prior Publication Data

US 2015/0375148 A1 Dec. 31, 2015

(30) Foreign Application Priority Data

Jun. 27, 2014 (DE) .................... 10 2014 009 323

(51) Int. Cl.
B01D 35/18 (2006.01)
B01D 29/21 (2006.01)
B01D 46/52 (2006.01)
B01D 46/24 (2006.01)
B01D 46/42 (2006.01)
H05B 3/06 (2006.01)
H05B 3/00 (2006.01)
B29L 31/14 (2006.01)

(52) U.S. Cl.
CPC .............. B01D 35/18 (2013.01); B01D 29/21 (2013.01); B01D 46/2414 (2013.01); B01D 46/4263 (2013.01); B01D 46/521 (2013.01); H05B 3/0014 (2013.01); H05B 3/06 (2013.01); B01D 2201/0423 (2013.01); B01D 2265/06 (2013.01); B29L 2031/14 (2013.01)

(58) Field of Classification Search
None
See application file for complete search history.

(56) References Cited

U.S. PATENT DOCUMENTS 2,103,434 A * 12/1937 Pennebaker ........... B01D 27/00
                                                              210/182
4,866,250 A * 9/1989 Pasbrig ................ F02M 31/125
                                                              123/549

(Continued)

FOREIGN PATENT DOCUMENTS

CN 200999676 Y 1/2008
CN 201461153 U 5/2010

(Continued)

Primary Examiner — Robert J Popovics
(74) Attorney, Agent, or Firm — James Hasselbeck (57) ABSTRACT A filter element (10) of a filter for fluid and a method for producing a filter element (10) are described. The filter element (10) has a filter medium (14) which is designed as a hollow body (12) and is closed at the periphery, at least with respect to an element axis (16). The filter medium (14) is enclosed on at least part of its periphery and at least part of its axis by an electric heating jacket (26). The heating jacket (26) is arranged in or on a fluid-permeable supporting hollow body (24). The supporting hollow body (24) is open or can be opened, at least in an initial assembly of the filter element (10) on at least one peripheral side for arrangement on the filter medium hollow body (12).

9 Claims, 4 Drawing Sheets (56) References Cited

U.S. PATENT DOCUMENTS

| | | | | |
|---|---|---|---|---|
| 9,808,750 B2* | 11/2017 | Klein | ................... | B01D 35/18 |
| 2010/0200485 A1 | 8/2010 | Parra et al. | | |
| 2014/0353229 A1* | 12/2014 | Klein | ................... | B01D 35/18 |
| | | | | 210/184 |
| 2015/0375148 A1* | 12/2015 | Klein | ................... | B01D 35/18 |
| | | | | 210/186 |

FOREIGN PATENT DOCUMENTS

| | | |
|---|---|---|
| CN | 102202759 A | 9/2011 |
| DE | 202007010302 U1 | 12/2008 |
| DE | 102013009200 A1 | 12/2014 |

\* cited by examiner

FILTER ELEMENT OF A FILTER, HEATING CAGE FOR A FILTER ELEMENT AND A METHOD FOR PRODUCING A FILTER ELEMENT

TECHNICAL FIELD

The invention relates to a filter element of a filter for fluid, in particular fuel, oil, water, urea solution or air, in particular for an internal combustion engine, in particular for a motor vehicle, which has a filter medium designed as a filter medium hollow body that is closed at the periphery at least with respect to an element axis, this filter medium being surrounded by an electric heating jacket over at least a portion of the periphery and at least a portion of the axis.

Further, the invention relates to a heating cage having an electric heating jacket for enclosing, over at least a portion of the periphery and at least a portion of the axis, a filter medium of a filter element, in particular of a filter element according to the invention, which is designed as a filter medium hollow body and is closed at the periphery, at least with respect to an element axis.

Furthermore, the invention relates to a method for production of a filter element in particular a filter element according to the invention, of a filter for fluid, in particular fuel, oil, water, urea solution or air, in particular in an internal combustion engine, in particular in a motor vehicle, wherein a filter medium is designed for a filter medium hollow body, which is closed on the periphery at least with respect to one element axis, wherein the filter medium hollow body is surrounded by an electric heating jacket, so that the heating jacket is arranged around the filter medium hollow body for at least a portion of the periphery and at least a portion of the axis.

BACKGROUND

DE 20 2007 010 602 U1 describes a filter element of a fuel filter for diesel fuel for a motor vehicle. The filter element comprises a filter body with a filter material. The filter body is designed to be essentially cylindrical. A heating element designed to be flat is wrapped around the filter element so that it is closed on the outside. The heating element is fixedly and inseparably attached to the filter body, to which end it is attached to an end disk by adhesive bonding, foaming in situ, injection molding or the like. The heating element comprises an electric heating conductor wire. Two ends of the heating conductor wire are curved radially inward for electric contacting. A housing made of an injection-molded plastic forms an electric connecting plug together with plug pins.

SUMMARY OF THE INVENTION

The object of the invention is to design a filter element, a heating cage and a method for production of a filter element of the type defined in the introduction which can be implemented easily and with which the filter element can be surrounded by the heating jacket as easily as possible. Furthermore, the heating cage should be mechanically stable.

This object is achieved according to the invention by the fact that the heating jacket is arranged in or on a fluid-permeable supporting hollow body, which surrounds the filter medium hollow body on the periphery and at least a portion of the axis and which is open or can be opened on at least one peripheral side for arranging on the filter medium hollow body at least for the initial assembly of the filter element.

Thus a mechanically stable heating cage is provided with which the supporting hollow body carries or supports at least the electric heating jacket. The heating jacket may be arranged in or on the supporting hollow body. It may be fixedly connected thereto or arranged separately therein. In addition the filter medium may be supported on the outside with the supporting hollow body. The supporting hollow body may thus serve as a frame part or as a supporting part of the filter element.

The supporting hollow body may advantageously be made of a plastic. Plastic can be molded easily. The supporting hollow body can thus be implemented with a low weight with respect to its installation space. Plastic can be physically and chemically resistant to the fluid to be filtered.

According to the invention, the supporting hollow body is open or can be opened on at least one peripheral side at least before being mounted on the filter medium hollow body. The filter medium hollow body can be introduced easily due to the fact that there is at least one open peripheral side. Thus the heating jacket may, if necessary, be arranged easily in the supporting hollow body. With the supporting hollow body, which is initially open at the periphery, shape designs in which the cross-sectional profile in the axial direction prevents axial penetration of the heating jacket and/or of the filter medium hollow body can also be implemented.

The supporting hollow body may advantageously be reopenable at least on a peripheral side, in particular on the peripheral side where it was open prior to assembly. In this way the supporting hollow body can be opened in particular for maintenance purposes and the filter medium hollow body and/or the heating jacket can be removed. The filter medium hollow body of the filter element can thus be replaced in particular on reaching its load limit, whereas the supporting hollow body with the heating jacket can be reused.

A cross-sectional profile on the radially inner peripheral side of the supporting hollow body may advantageously correspond to a cross-sectional profile of the filter medium hollow body and/or of the electric heating jacket. The supporting hollow body may advantageously be cylindrical. It may advantageously have a round, oval or angular cross section.

The supporting hollow body may advantageously be designed like a skeleton or a framework. In this way it may have flow openings of a sufficient size and number through which the fluid can flow. Thus a pressure drop between the oncoming flow side and the outgoing flow side of the supporting hollow body can be reduced. The supporting hollow body may advantageously have a plurality of peripheral struts running in the peripheral direction spaced a distance apart from one another axially and possibly connected to one another by axial struts extending in the axial direction.

In the closed supporting hollow body the heating jacket may advantageously be designed as a hollow body. The heating jacket may advantageously run around the full periphery. Alternatively, the heating jacket may be open on at least one peripheral side. The heating jacket may advantageously be assembled from a plurality of heating jacket sections, each extending around a portion of the periphery. The heating jacket may advantageously have on the whole approximately the same axial extent as the filter medium hollow body. In this way it can cover the filter medium hollow body over its entire axial extent. Alternatively, the heating jacket may also extend over only a portion of the axis, i.e., over a portion of the axial extent of the filter medium hollow body. An end face of the heating jacket may advantageously be in contact with or at least situated in the vicinity of an end body of the filter element, in particular an end disk, where there is an electric connecting element for the heating jacket. An electric connection to the connecting element can thus be implemented easily there. Alternatively, the two end faces of the heating jacket may each be arranged at an axial distance from the end faces of the filter medium hollow body.

After assembly in the supporting hollow body, the filter medium may advantageously be expand outward. The heating jacket may advantageously be in contact with the radially outer peripheral side of the filter medium. The heating jacket, the supporting hollow body and/or the filter medium hollow body may be connected to at least one end body, in particular an end disk of the filter element by means of adhesive bonding, in situ foaming, injection molding or with the help of mechanical connecting elements, in particular clamps or locks.

The heating jacket may advantageously have a heating film, a heating fabric or a nonwoven heating medium. The heating jacket may also have a knit textile or some other type of textile. The heating jacket may advantageously be flexible. It can easily be adapted to the shape of the supporting hollow body and/or of the filter medium hollow body in this way.

The heating jacket may advantageously be permeable for the fluid. In this way fluid can pass through the heating jacket from the inside radially to the outside radially or vice versa. The heating jacket may therefore have a plurality of flow openings through which the fluid can flow. With a textile type of heating jacket, in particular one that is woven or knit, machine widths can be so large that the fluid can flow through them. Pore openings may be large accordingly in the case of a nonwoven heating jacket, in particular of the nonwoven or fleece type.

The heating jacket may advantageously be situated on the oncoming flow side of the filter medium hollow body. With the heating jacket fluid can be heated before the oncoming flow toward the filter medium. Flowability of the fluid can be improved in this way, so that a pressure drop between an oncoming flow side, i.e., a crude side and an outgoing flow side, i.e., a clean side of the filter medium can be reduced. Accordingly the supporting hollow body may be situated on the oncoming flow side of the filter medium hollow body.

The filter medium hollow body may advantageously approximately have the shape of al hollow cylinder. The filter medium hollow body may also taper conically in the axial direction. The filter medium hollow body may have a round, oval, angular or other type of cross section. The filter element may advantageously be a round filter element or a conical oval round filter element. In the case of a round filter element the filter medium hollow body may be implemented as a round hollow cylinder.

The filter medium may advantageously be pleated in a star pattern and closed on the periphery. Due to the star pattern pleating, a high packing density can be achieved. Thus a ratio of the active surface area for filtering to the required installation space can be improved. Instead of a filter medium pleated in a star pattern, the filter medium may also have a corrugated profile in the periphery direction. Instead of this the filter medium may also be flat and closed at the periphery. In particular the filter medium may be wound or coiled.

In an advantageous embodiment, the heating jacket may be connected to an electric connecting element, which can be connected to electric lines to supply power to the electric heating jacket.

The electric connecting element may be connected to corresponding heating conductors, in particular heating webs, heating layers or heating threads of the heating jacket, in particular by riveting, soldering, clamping or some other type of electrical connection.

The electric connecting element may advantageously be attached to the supporting hollow by means of a pivot connection. In assembly of the filter element, the connecting element can be pivoted out of a pre-assembly position on the outside of the periphery on the filter element into a final assembly position on the inside of the filter element by means of the pivot connection. The connecting element leaves free the end faces of the heating jacket and of the filter medium hollow body in the pre-assembly position in this way, so that they are freely accessible. When considered from the outside radially, the supporting hollow body may advantageously have a recess, in which the pivot connection is secured and the pivot connection and/or the sections of the connecting element can be countersunk there in the final assembly position. In this way the installation space of the filter element in the radial direction can be further reduced.

Furthermore, a connection of corresponding electric lines to supply electric power to the electric heating jacket can be implemented more easily in the electric connecting element on the end side of the filter element than on the peripheral side.

In another advantageous embodiment, the heating jacket may be situated between a peripheral side of the filter medium hollow body and a peripheral side of the supporting hollow body. In this way the heating jacket may be arranged so that it is support toward the outside. The heating jacket can thus be held and supported between the filter medium hollow body and the supporting hollow body. Close contact between the heating jacket and the filter medium can be implemented in this way. Heating efficiency can therefore be improved. The heating element may advantageously be connected to the supporting hollow body. Alternatively, the heating jacket may be at least partially embedded in the supporting hollow body. Alternatively, the heating jacket may be arranged on the peripheral side of the supporting hollow body that is on the outside radially.

In another advantageous embodiment, the supporting hollow body may have at least two supporting body shells extending over a portion of the periphery, connected to one another on at least one peripheral side at the latest at the time of the final filter element for implementation of the supporting hollow body.

The supporting body shells may advantageously be initially completely separate and arranged separately from one another on the filter medium hollow body. The supporting body shells can then be connected to one another on at least one peripheral side where they abut against one another. The supporting body shells may advantageously be connected to one another on all the respective peripheral sides.

In another advantageous embodiment, the supporting body shells can be connected to one another by means of at least one movable connection on a peripheral side and they can be pivoted toward one another for peripheral closing of the supporting hollow body around the movable connection. Positioning of the supporting body shells relative to one another can be simplified in this way. Furthermore, the supporting body shells can be connected to one another in a loss-proof manner. Thus it is possible to simplify storage, shipping and/or assembly. The supporting body shells may advantageously be connected to one another in one piece with the movable connection. Production of the supporting body shells can be simplified in this way. The movable connection can be implemented in the form of a film hinge. A film hinge may be shaped easily in the case of supporting body shells made of plastic, in particular being cast, injection molded or blow molded. Using the film hinge, a simple movable connection which does not require any separate movable parts can be implemented. The supporting body shells may advantageously be arranged radially on the outside on the filter medium hollow body to surround the filter medium hollow body with the supporting hollow body and the heating jacket or the filter medium hollow body may be arranged in at least one of the supporting body shells. Next, the supporting body shells may also be joined to one another at the open peripheral side and the supporting hollow body connected.

In another advantageous embodiment, the supporting body shells may be joined together by means of at least one connection which is initially open and is closable for peripheral closure of the supporting hollow body. The supporting body shells can thus be joined together easily on the peripheral side of the supporting hollow body which is initially open. The closable connection may advantageously have a latch connection in which corresponding latching elements on the two supporting body shells can be latched together. A latch connection can be closed easily. The latch connection may advantageously be openable without destroying it. In this way the supporting hollow body can be opened in particular for maintenance or cleaning purposes. In particular the latch connection may have at least one strap with a saw-tooth profile, which is attached to one of the supporting body shells. A corresponding elastic nose which can cooperate with the saw-tooth profile may be connected to the other supporting body shell. The strap with the saw-tooth profile may advantageously extend approximately tangentially to the supporting hollow body. Thus it can easily be inserted into a corresponding tangential opening arranged in or on the elastic nose when connecting the supporting body shells. A variable, closable connection can be implemented by means of the strap with the saw-tooth profile. Thus, peripheral tolerances of the supporting hollow body in particular can be compensated.

Alternatively, the at least one closable connection may also be implemented by means of another form-fitting, physically-bonded and/or force-locking connecting method in particular by means of adhesive bonding, welding or clamping.

The closable connection may also be designed so that it cannot be open non-destructively. In this way the supporting hollow body with the heating jacket can be inseparably connected to the filter medium hollow body.

The supporting body shells may advantageously be interconnected on a peripheral side with a movable connection and on another peripheral side they may be interconnected with a closable connection.

In another advantageous embodiment, the heating jacket may have at least two jacket sections each extending around a portion of the periphery, each of which may be arranged in or on a corresponding supporting body shell. The jacket sections are thus easily adaptable to the shape of the corresponding supporting body shell. They can be placed easily in or on the supporting body shells. The transitions between the supporting body shells in regions of a possible movable connection or a closable connection between the supporting body shells need not be taken into account. The supporting body shells may each be provided with a jacket section independently of one another. The jacket sections may advantageously be electrically connected to one another. In this way only one common electric connecting element is necessary for both jacket sections.

Alternatively, a continuous heating jacket which extends peripherally over all supporting body shells may be used. In this way it is not necessary to install separate jacket sections.

Furthermore, the technical object is achieved with the heating cage according to the invention due to the fact that the heating jacket is arranged in or on a fluid-permeable supporting hollow body, which is open or can be opened at least on a peripheral side at least in the initial assembly of the filter element for arrangement on the filter medium hollow body.

The advantages and features that are listed in conjunction with the filter element according to the invention are applicable for the heating cage according to the invention and its advantageous embodiments accordingly and vice versa.

In one advantageous embodiment, the supporting hollow body may have at least two supporting body shells, each of which extends around a portion of the periphery and which are interconnected on at least one peripheral side at the latest on the finished filter element for implementation of the supporting hollow body.

The technical object is also achieved with the method according to the invention for production by the fact that a supporting hollow body for the heating jacket is initially open on a peripheral side and at least the filter medium hollow body is introduced into the supporting hollow body from the open peripheral side.

The advantages and features listed in conjunction with the filter element according to the invention and the heating cage according to the invention and their advantageous embodiments are applicable to the method according to the invention and its advantageous embodiments accordingly and vice versa.

According to the invention the supporting hollow body may be placed on the filter medium hollow body from the peripheral side. In the case of a cohesive supporting hollow body, the edges of the supporting hollow body may be moved initially apart from one another on the open peripheral side if necessary, in particular through corresponding bending of the supporting hollow body for introducing the filter medium hollow body. After introducing the filter medium hollow body, the edges of the supporting hollow body may be moved toward one another to surround the filter medium hollow body with the supporting hollow body. The open peripheral edges may advantageously be joined together for peripheral closure of the supporting hollow body. In this way supporting hollow bodies and filter medium hollow bodies with transverse profiles that vary in the axial direction may advantageously be arranged in one another from a peripheral side in which an axial introduction of the filter medium hollow body into the supporting hollow body is no longer possible In an advantageous embodiment of the method, the supporting hollow body may be implemented from at least two supporting body shells each extending around a portion of the periphery and which can be moved toward one another for surrounding the filter medium hollow body peripherally. The supporting body shells can be joined to one another by means of movable connections such that they can be pivoted toward one another around these movable connections.?

In another advantageous embodiment of the method, the heating jacket may be arranged on an inner peripheral side of the supporting hollow body. The heating jacket may advantageously be arranged in the supporting hollow body before the filter medium hollow body is arranged in the supporting hollow body. The heating jacket may advantageously be introduced through the open peripheral side into the supporting hollow body. On the inside of the supporting hollow body the heating jacket may be arranged so that it is protected. Furthermore, the heating jacket may be clamped between the peripheral side of the supporting hollow body on the inside radially and the peripheral side of the filter medium on the outside radially. In this way a close contact between the heating jacket and the filter medium can be implemented so that the heating efficiency can be improved.

Alternatively, the heating jacket may also be arranged on an outer peripheral side of the supporting hollow body.

In another advantageous embodiment of the method the at least one peripheral side of the supporting hollow body may be closed after introducing the filter medium hollow body. Then the corresponding edges of the supporting hollow body can be joined together separably in a nondestructive manner or not separably in a nondestructive manner. The supporting hollow body can be arranged on the filter medium hollow body in a stable position in this way.

BRIEF DESCRIPTION OF THE DRAWINGS

Additional advantages, features and details of the invention are derived from the following description in which exemplary embodiments of the invention are explained in greater detail with reference to the drawings Those skilled in the art will expediently also consider individually the features disclosed in any combination in the drawings, the description and the claims and may combine them to yield reasonable additional combinations. The drawings show schematically:

In the figures, the same parts are provided with the same reference numerals.

DETAILED DESCRIPTION OF PREFERRED EMBODIMENTS

Figure 1:
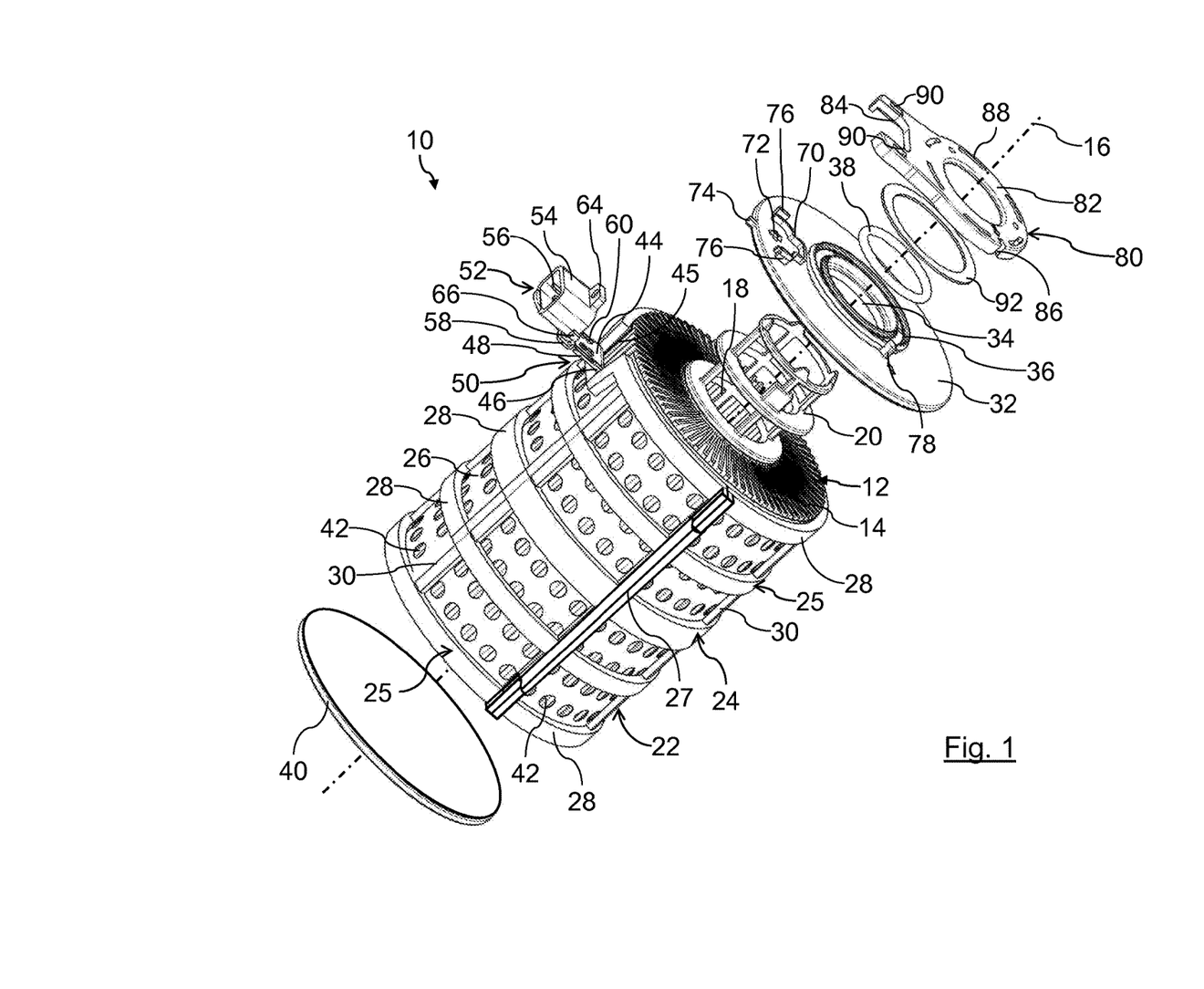
FIG. 1 an exploded diagram of a round filter element of a fuel filter having a heating cage according to a first exemplary embodiment, having two half-shells and two heating film sections which are pivotably connected to one another with a film hinge.

FIG. 1 shows a filter element 10 of a fuel filter of an internal combustion engine of a motor vehicle in an exploded diagram. The fuel filter may preferably be arranged in a fuel line for cleaning liquid fuel, for example, diesel fuel.

The filter element 10 is a so-called round filter element which has an approximately hollow cylindrical shape on the whole with a round cross section. The filter element 10 is arranged in a filter housing, which is otherwise not shown, so that it separates an inlet of the filter housing for the fuel to be filtered from an outlet. The filter element 10 may be replaceable or may be permanently arranged in the filter housing.

The filter element 10 comprises filter bellows 12 of a filter medium 14 which is pleated in the form of a star, for example, a filter nonwoven or filter paper or some other filter medium suitable for filtering fuel. The filter bellows 12 have on the whole approximately the shape of a hollow circular cylinder which is coaxial with an imaginary element axis 16. When mentioning "radial," "axial" or "peripheral" below, these terms refer to the element axis 16 unless otherwise indicated.

A framework-type central supporting pipe 20 is arranged coaxially in the interior 18 of the filter bellows 12. The central supporting pipe 20 is permeable for the fuel in the radial direction. On its end faces the central supporting pipe 20 is open so that fuel can escape from an interior space in the central connecting tube 20 in the axial direction. A peripheral side of the filter bellows 12 on the inside radially is in contact with a peripheral side of the central supporting pipe 20 on the outside radially so that the central supporting pipe 20 supports the filter bellows 12.

On the outside radially, the filter bellows 12 is surrounded by a coaxial heating cage 22 according to a first exemplary embodiment.

The heating cage 22 has the shape of a hollow circular cylinder on the whole. The heating cage 22 has a cage frame 24 on the outside radially and an electrically operated heating film 26 on the inside radially. The heating film 26 may also be referred to as a heating jacket.

Figure 2:
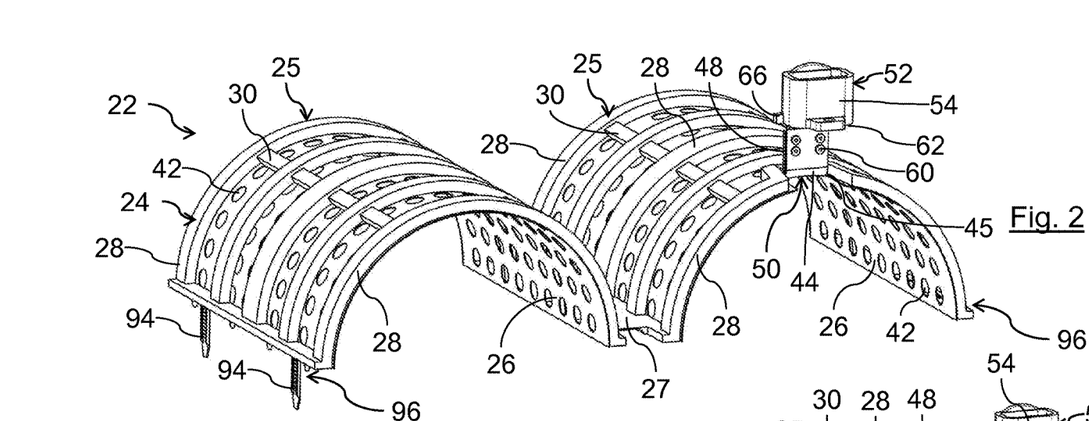
FIG. 2 the open cage from FIG. 1 in a single view.
Figure 3:
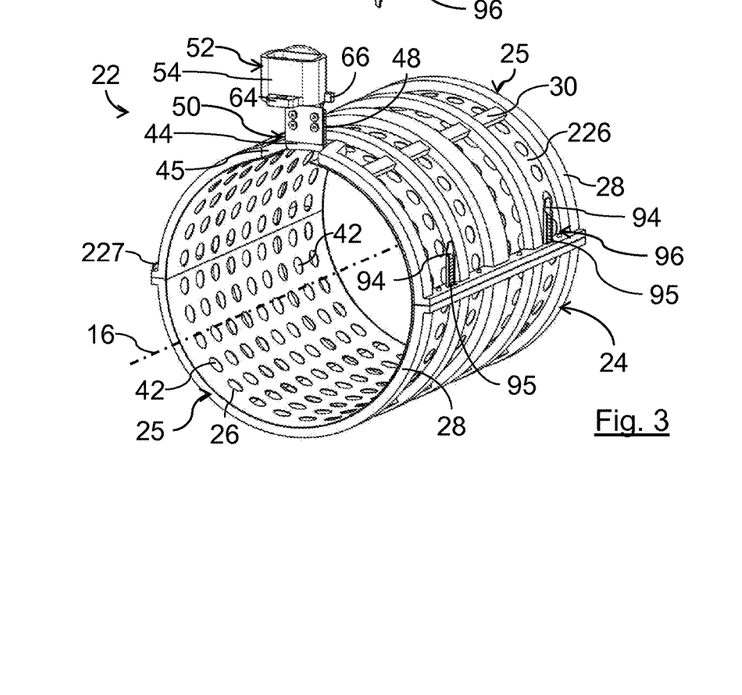
FIGS. 3 and 4 the closed heating cages from FIGS. 1 and 2 in different perspectives.
Figure 4:
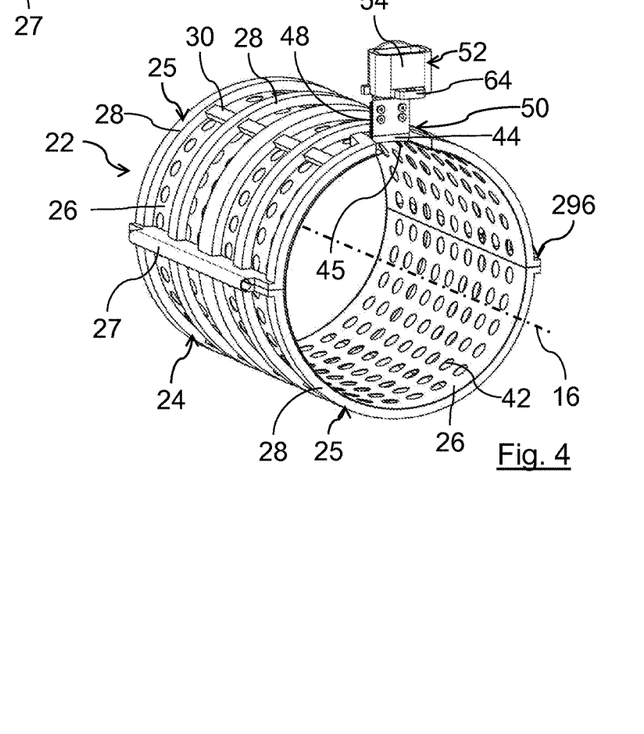

The cage frame 24 is made out of plastic. FIGS. 2 to 4 show the cage 22 only in different perspectives. The cage frame 24 has two half-shells 25 which are connected to one another and can be pivoted by means of a film hinge 27 on the peripheral side. The film hinge 27 serves as a movable connection by means of which the half-shells 25 can be pivoted toward one another to close the heating cage 22. The half-shells 25 and the film hinge 27 are connected to one another in one piece.

Each of the half-shells 25 has a total of five peripheral struts 28 which run in the peripheral direction and are arranged so they are spaced a distance apart from one another in the axial direction. The peripheral struts 28 are interconnected via axial struts 30 which run in the axial direction. The axial struts 30 are arranged so they are distributed on the periphery. The heating cage 22 has on the whole approximately the same axial extent as the filter bellows 12 so that the filter bellows 12 is arranged almost completely inside the heating cage 22.

One of the half-shells 25, shown at the left in FIG. 2, has two closure straps 94 which extend tangentially on their free axial longitudinal side and are part of a closable connection 96. The other half-shell 25, shown at the right in FIG. 2, has two closure openings 95, which extend tangentially on its free axial longitudinal side and into which the closure straps 94 can be inserted into these closure openings to close the heating cage 22. The closure straps 94 and closure openings 95 of the closable connection 96 are shown in detail in FIG. 5 and are shown in an axial longitudinal section in FIG. 6.

Figure 5:
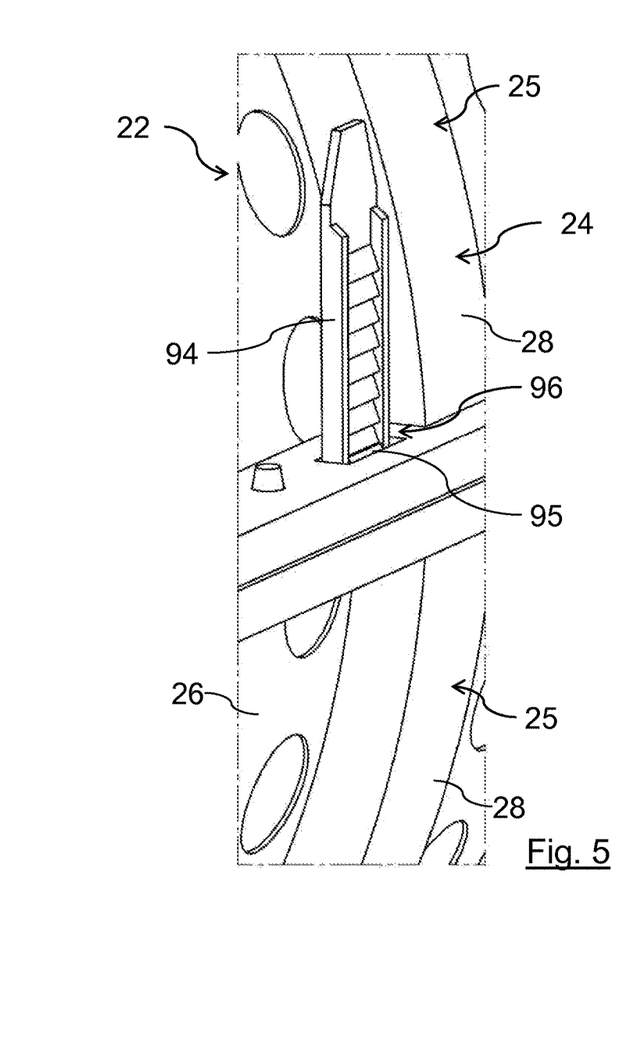
FIG. 5 a detailed view of the closed heating cages from FIGS. 1 to 4 in the region of a closable connection.
Figure 6:
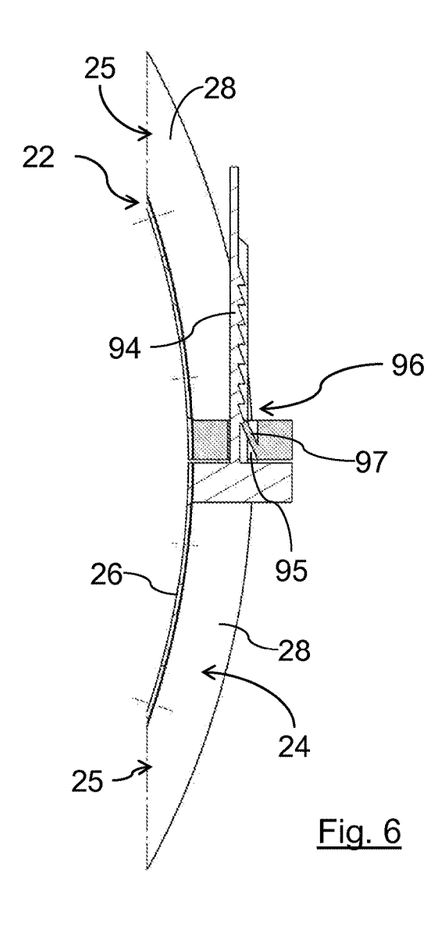
FIG. 6 a longitudinal section through the detailed view of the closed heating cage from FIG. 5.

The closure straps 95 have a saw-tooth profile on their peripheral side on the outside radially with respect to the closed heating cage 22. A latching nose 97 which is elastic radially is arranged in each of the closure openings 95. The saw-tooth profile of the closure straps 94 is designed so that in closing of the connection 90 as shown in FIGS. 3, 5 and 6, the latching noses 97 each spring radially outward at first and then engage behind the saw teeth of the saw-tooth profile, as seen in the direction of insertion. It is impossible to open the closable connection 96 without prior unlocking of the latching noses 97 and release of the saw teeth.

The heating film 26 is in contact with the peripheral side of the cage frame 24 on the inside radially. Furthermore, the heating film 26 with its peripheral side on the inside radially is in contact with the peripheral side on the outside radially, i.e., the radially exterior folded edges of the filter bellows 12. The cage frame 24 supports the heating film 26. Furthermore, the cage frame 24 also supports the filter bellows 12 indirectly or via the heating film 26 and thus stabilizes the filter element 10 as a whole.

On one end face of the filter bellows 12, which is facing an outlet connection of the filter housing for filtered fuel with the filter element 10 installed (see top of FIG. 1), a round connecting end disk 32 is arranged. The connecting end disk 32 is made of plastic. The connecting end disk 32 is glued tightly to the filter bellows 12. The connecting end disk 32 has a central outlet opening 34 for the filtered fuel. A diameter of the connecting end disk 32 on the outside radially corresponds approximately to the diameter of the cage frame 24 on the inside radially.

The connecting opening 34 is surrounded by two coaxial circular ring-shaped ring protrusions on the outside of the connecting end disk 32 opposite the filter bellows 12 in the axial direction such that these coaxial circular ring-shaped ring protrusions extend parallel to one another in the axial direction. The ring protrusions form a gasket receptacle 36 for a ring gasket 38. The gasket receptacle 36 has a U-shaped profile which is open on the side facing away from the filter bellows 12.

On the end face of the filter bellows 12 opposite the connecting end disk 32 (at the bottom of FIG. 1) an opposing end disk 40 is arranged. This end disk is also tightly bonded to the filter bellows 12 and securely connected to the central supporting pipe 20 by means of a corresponding latch connection.

The heating film 26 consists of two film sections. A first film section of the heating film 26 which also comprises contact straps 44 as explained in greater detail below is situated on the inside of the half-shell 25 with the closure openings 95. This half-shell 25 also comprises an indentation 45, which is explained in greater detail further below, for a film hinge 46 and a fastening tongue 48 of a pivot connection 50, which are concealed in FIGS. 2 to 4. The other film section of the heating film 26 is arranged on the inside of the other half-shell 25. The two film sections of the heating film 26 are electrically connected to one another by means of corresponding contact lines in a manner that is not of further interest here.

Each of the film sections of the heating film 26 is flat and rectangular in its original shape. The film sections of the heating film 26 each have a plurality of through-holes 42, distributed on the periphery with respect to the heating cage 22. The through-holes 42 have a round cross section, for example. However, they may also have a different cross section, for example, a rectangular cross section.

On a peripheral side in the region of a peripheral strut 28 of the cage frame 24 on the exterior axially and facing the connecting end disk 32, a corresponding film section of the heating film 26 has two electric contact straps 44, with which the heating film 26 is electrically contacted, i.e., can be supplied with an electric current. The two contact straps 44 lie side by side, as seen in the peripheral direction and are provided only with a single reference numeral 44 in the figures for better comprehensibility. The contact straps 44 consist of sections of the film section of the heating film 26 which can be bent radially outward by means of corresponding axial recesses on the end face of the film section of the heating film 26.

In the region of the contact straps 44 the peripheral strut 28 on the exterior axially and facing the connecting end disk 32, belonging to the corresponding half-shell 25 of the cage frame 24 on the right side of FIG. 2 has an indentation 45. The indentation 45 has an approximately U-shaped profile as seen from the outside radially, wherein the "U" is open toward the connecting end disk 32.

A film hinge 46 is connected in one piece to the peripheral strut 28 on the side of a section of the indentation 45 extending around the periphery and facing the connecting end disk 32. The film hinge 46 is situated approximately at the center of the indentation 45 as seen in the radial direction. The film hinge 46 has a fastening tongue 48 on the side facing away from the peripheral strut 28. The fastening tongue 48 can be pivoted by means of the film hinge 46 out of the pre-assembly position shown in FIGS. 1 to 4, in which it extends radially outward from the cage frame 24 into an end assembly position which is not shown in the figures and in which it extends in the axial direction. The film hinge 46 with the fastening tongue 48 forms a pivot connection 50 which connects an electric connecting plug 52 to the cage frame 24.

The connecting plug 52 has a plug housing 54 made of plastic in which two contact lines made of metal are embedded. The contact lines are designed as contact pins 56 on the connecting side of the connecting plug 52. The contact pins 56 develop into corresponding connecting straps 58 which lead out of the plug housing 54 at the side. The connecting straps 58 are each connected at their free ends to the fastening tongue 48 by means of rivets 60. The contact straps 44 of the corresponding part of the heating film 26 are arranged on the side of the connecting straps 58 opposite the fastening tongue 48. Each of the contact straps 44 is electrically connected to one of the connecting straps 58. The rivets 60 pass through the contact straps 44, the connecting straps 58 and the fastening tongue 48. The connecting straps 58 are thus sandwiched between the fastening tongue 48 and the contact straps 44. The connecting plug 52 is held pivotably on the cage frame 24 with the help of the connecting straps 58 on the fastening tongue 48 and by means of the film hinge 46.

A bottom side 62 of the plug housing 54 facing the half-shell 25 of the cage frame 24 is flat. The bottom side 62 of the plug housing 54 runs at a right angle to the longitudinal extent of the fastening tongue 48, the contact straps 44 there and the connecting straps 58 there. The fastening tongue 48, the connecting straps 58 and the contact straps 44 are situated at the side of the bottom side 62 of the plug housing 54. When seen in a projection perpendicular to the bottom side 62, they are outside of the latter. In the pre-assembly position the plug housing 54 sits on the side of the fastening tongue 48, the contact straps 44 and the connecting straps 58 facing the connecting end disk 32. In the final assembly position, the fastening tongue 48, the contact straps 44 and the connecting straps 58 are inserted into the indentation 45 in the axially exterior peripheral strut 28 and are thus accommodating in a space-saving manner when considered in the radial direction.

The bottom side 62 of the plug housing 54 has an approximately rectangular periphery with rounded corners. On the side facing away from the connecting straps 58, the plug housing 54 has a protrusion 64 whose bottom side forms a plane with the bottom side 62. The protrusion 64 extends between the rounded edges of the plug housing 54 on the side opposite the connecting straps 58. On the two opposite sides, which are adjacent to the side with the protrusion 64, the plug housing 54 has two positioning noses 66, which extend outward from the exterior side of the plug housing 54. A positioning recess, which has an approximately cross-shaped cross section, is also arranged in the bottom side 62, but is concealed in FIGS. 1 to 4. The positioning recess is situated approximately at the center of the bottom side 62.

On its exterior side facing away from the filter bellows 12, the connecting end disk 32 has a receptacle contour 70 for the bottom side 62 of the plug housing 54. The receptacle contour 70 is situated close to the peripheral side of the connecting end disk 32 facing the connecting plug 52. It comprises a web extending in the axial direction from the exterior side of the connecting end disk 32. This web is curved repeatedly in its profile. The web is symmetrical with a radius of the connecting end disk 32. The profile of the web of the receptacle contour 70 corresponds to the profile of the exterior side of the plug housing 54 with the protrusion 64 in the region of the bottom side 62. The receptacle contour 70 is open on the outside radially on its side facing the connecting plug 52 in its free assembly position. At the center of the receptacle contour 70, there is a positioning cross 72 in the form of a protrusion, which fits into the positioning recess in the plug housing 54, extending in the axial direction.

A disk-side positioning nose 74 is arranged on the radially exterior peripheral side of the connecting end disk 32 in a radial extension of the positioning cross 72 and extends radially outward. In the final assembly position of the connecting plug 52, the plug housing 54 with its bottom side 62 and its protrusion 64 is situated inside the receptacle contour 70 of the connecting end disk 32. The positioning noses 66 of the plug housing 54 are each in contact with a free end of the receptacle contour 70. The positioning cross 72 is inserted into the positioning recess on the plug housing 54. The disk-side positioning nose 74 protrudes through the connecting plug 52 between the connecting straps 58.

A latch element 76 is situated on opposite sides as seen in the peripheral direction outside of the receptacle contour 70. The latch elements 76 extend from the outside of the connecting disk 32 in the axial direction. Latching noses on the latch elements 76 are situated on the exterior side facing away from the other latch element 76. The latch elements 76 are situated approximately in a plane with the positioning cross 72 which runs perpendicular to a radius of the filter element 10.

Furthermore, a positioning aid 78 in the form of a protrusion is arranged on the opposite side of the gasket receptacle 36 on the exterior radially, this side being obliquely opposite the receptacle contour 70. The positioning aid 78 extends from the radially exterior peripheral side of the radially exterior ring protrusion which borders the gasket receptacle 36, in the radial direction and from the exterior side of the connecting end disk 32 in the axial direction.

On the outside of the connecting end disk 32 a fixation element 80 is attached. The fixation element 80 has an approximately ring-shaped sealing fixation section 82 and a fork-like plug fixation section 84. The sealing fixation section 82 is arranged coaxially on the gasket receptacle 36. The plug fixation section 84 extends radially outward from the sealing fixation section 82.

The sealing fixation section 82 has an approximately U-shaped profile. It is attached with its open side to the ring protrusions of the gasket receptacle 36 of the connecting end disk 32, so that the side walls of the sealing fixation section 82 reach around the ring protrusions of the gasket receptacle 36. The sealing fixation section 82 has a fixation groove 86 on a radially exterior peripheral side such that when the fixation element 80 is installed, the positioning aid 78 of the connecting end disk 32 engages in the fixation groove. Furthermore, the sealing fixation section 82 has a plurality of through-slots 88 on its side facing away from the connecting end disk 32 so that air can escape through these slots when the fixation element 80 is attached.

The profile of the plug fixation section 84 on its U-shaped interior corresponds approximately to the profile of the exterior of the plug housing 54 outside of the protrusion 64. When the fixation element 80 is installed, the plug fixation section 84 grips the plug housing 54 on the side of the protrusion 64 facing away from the connecting end disk 32. The plug fixation section 84 has a latching slot 90 on each of its legs, so that one of the latching elements 76 of the connecting end disk 32 engages in each latching slot when the fixation element 80 is installed.

The fixation element 80 affixes the plug housing 62 on the connecting end disk 32 as well as the ring gasket 38 and a ring disk 92 in the gasket receptacle 36. The ring disk 92 is arranged between the ring gasket 38 and the sealing fixation section 82.

During operation of the fuel filter, the fuel flows through the filter element 10 from the outside radially to the inside radially. In flowing through the heating film 26, the fuel is heated before reaching the filter medium 14. The filtered fuel leaves the interior 18 through the outlet opening 34 in the connecting end disk 32.

In a method for production of the filter element 10, the filter bellows 12 are formed by pleating the filter medium 14 in a star pattern. The cage frame 24 with the two half-shells 25 is produced as a one-piece plastic part jointly with the film hinge 46 and the fastening tongue 48 of the pivot connection 50.

Next, the two film sections of the heating film 26 are arranged in the respective half-shells 25. The film section of the heating film 26 is arranged with the contact straps 44 on the radially inner peripheral side of the corresponding half-shell 25, so that the contact straps 44 point radially outward through the indentation 45 in the axially exterior peripheral strut 28.

The prefabricated connecting plug 52 is connected with its connecting straps 58 to the fastening tongue 48 and the contact straps 44 by means of the rivets 60. In the pre-assembly position, the connecting plug 52 is situated on the radial exterior of the cage frame 24 on the periphery, as shown in FIGS. 1 to 4.

The filter bellows 12 are preferably inserted in the radial direction into one of the half-shells 25 of the heating cage 22.

The half-shells 25 are next pivoted toward one another via the film hinge 27, wherein the closure straps 94 are inserted into the closure openings 95. The saw-tooth profiles of the closure straps 94 here cooperate with the elastic noses 97. The heating cage 22 surrounds the filter bellows 12 so that it is closed on the periphery.

The central supporting pipe 20 is inserted into the interior 18 of the filter bellows 12 in the axial direction. Alternatively, the central supporting pipe 20 may first be inserted into the interior 18 of the filter bellows 12 and then placed jointly with the filter bellows 12 in the half-shells 25 of the heating cage 22.

Next, the connecting end disk 32 and the opposing end disk 40 are arranged on the corresponding end faces of the filter bellows 12. The connecting end disk 32 is oriented so that the positioning nose 74 is situated approximately at the center in the indentation 45 in the axially exterior peripheral strut 28, as seen in the peripheral direction. The connecting end disk 32 and the opposing end disk 40 are glued tightly to the end faces of the filter bellows 12 in a manner that is of no further interest here. Alternatively, the connecting end disk 32 and the opposing end disk 40 may also be connected to the filter bellows 12 before the latter are inserted into the half-shells 25.

Next, the connecting plug 52 is pivoted by means of the pivot connection 50 toward the axial exterior side of the connecting end disk 32. In doing so the plug housing 54 with the protrusion 64 on the bottom side 62 is guided into the receptacle contour 70. In the final assembly position, the positioning noses 66 are in contact with the receptacle contour 70 and the positioning cross 72 engages in the positioning recess in the plug housing 54.

Then the ring gasket 38 and the ring disk 92 are placed in the gasket receptacle 36. The fixation element 80 is then placed on the gasket receptacle 36 in the axial direction with its open side facing forward. In doing so the fixation element 80 is oriented so that the positioning aid 78 engages in the fixation groove 86 in the sealing fixation section 82 and the plug fixation section 84 grips the plug housing 54. The latching elements 76 protrude into the latching slots 90 and engage with them in the end position of the fixation element 80. The finished filter element 10 can then be installed in the filter housing.

FIGS. 7 through 10 show a second exemplary embodiment of a heating cage 122 in different phases of production. The second exemplary embodiment differs from the first exemplary embodiment from FIGS. 1 through 6 in that a continuous heating film is provided, also extending over the film hinge 27 on the periphery.

Figure 7:
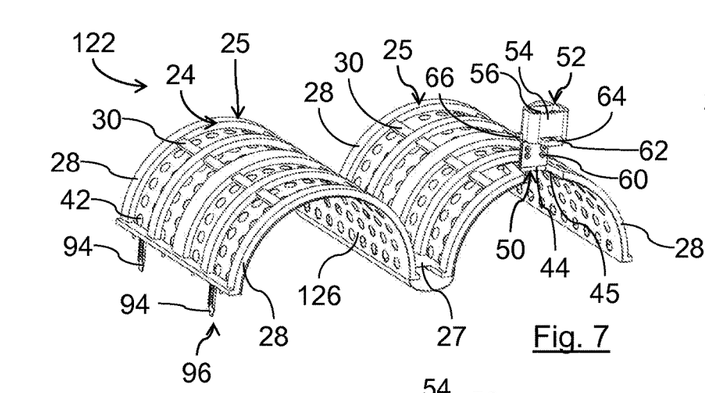
FIGS. 7 and 8 a heating cage according to a first exemplary embodiment which is similar to the heating cage according to the first exemplary embodiment from FIGS. 1 to 6, wherein a continuous heating film is arranged here in pre-assembly on the insides of the two half-shells.
Figure 8:
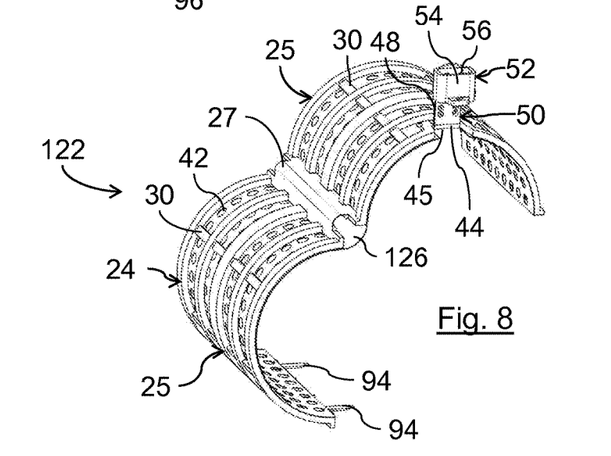

In a first exemplary method for producing the second exemplary embodiment of the heating cage 122 which is shown in FIGS. 7 and 8, the heating film 126 is arranged in the region of the two half-shells 25 on the radially interior peripheral side of the cage frame 24. The filter bellows 12 not shown in FIGS. 7 and 8 are placed in the one of the half-shells 22 as in the first exemplary embodiment. Next the half-shells 25 are pivoted toward one another and sealed with the sealable connection 96 as in the first exemplary embodiment illustrated in FIGS. 1 to 6. The additional production steps correspond to the production of the first exemplary embodiment from FIGS. 1 to 6.

Figure 9:
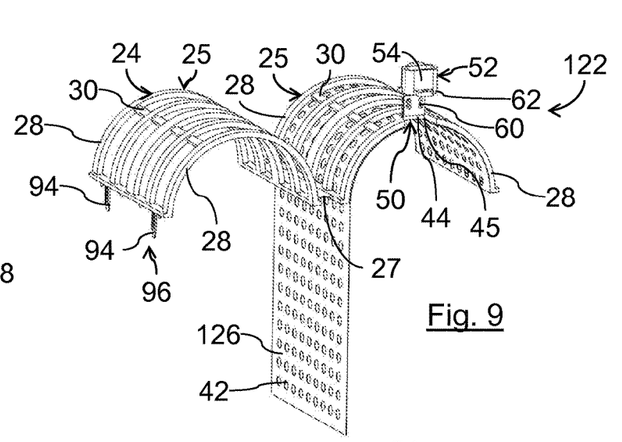
FIGS. 9 and 10 the heating cage from FIGS. 7 and 8, wherein the continuous heating film here is initially arranged only on one of the two half-shells and the second half-shell is then pivoted onto the first half-shell, so that the heating film is also in contact with the inside of the second half-shell.
Figure 10:
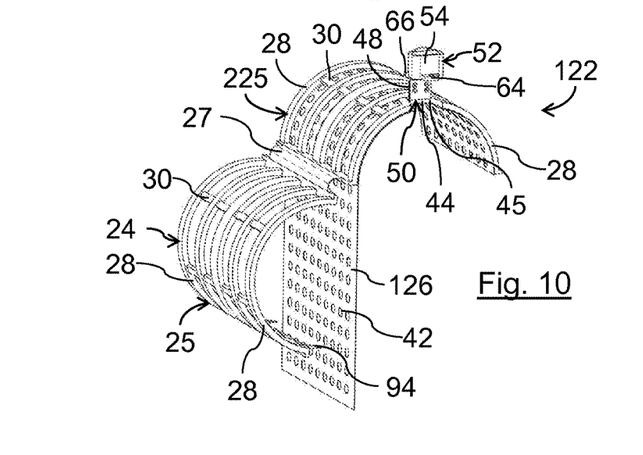

FIGS. 9 and 10 show a second exemplary method for producing the heating cage 122 from FIGS. 7 and 8. The second production method differs from the first production method according to FIGS. 7 and 8 in that the heating film 126 is first arranged only on the inside of the half-shell 25 of the cage 24 on which the connecting plug 52 is also situated. The section of the heating film 126 which is later placed in the other half-shell 25 first points away freely from the first half-shell 25. The filter bellows 12 not shown in FIGS. 7 and 8 are placed in the half-shell 25 with the connecting plug 52. Next, as indicated in FIG. 10, the second half-shell 25 with the closure straps 94 is pivoted toward the first half-shell 25 with the heating film 26 around the film hinge 27. In doing so, the section of the heating film 326, which is initially free, which is not indicated in the figures, is placed in the second half-shell 25 and the closable connection 96 is closed as done in the exemplary embodiment in FIGS. 1 to 6. The additional production steps correspond to the production of the first exemplary embodiment from FIGS. 1 to 6.

In all the exemplary embodiments of a filter element 10, a heating cage 22 and a method for producing a filter element 10, as described above, the following modifications are possible, among others:

The invention is not limited to a filter element 10 of a fuel filter of an internal combustion engine of a motor vehicle. Instead it may also be used in other types of filters for fluids, for example, for oil, water, air or urea. The fuel filter may also be used for other types of fuels, for example, liquid fuels, instead of diesel fuel. The invention may also be used outside of automotive technology, for example, in industrial motors. It may also be used outside of internal combustion engines.

Instead of having a round cross section, the filter element 10 may also have a different cross section, for example, an oval or polygonal cross section. Instead of a cylindrical shape, the filter element 10 may also have a different shape, for example, a conical shape.

Instead of being pleated in a star pattern or curved, the filter medium 14 may also be unpleated, for example, being coiled as a so-called coil filter.

The connecting end disk 32 and/or the opposing end disk 40 may also be connected to the filter bellows 12 in some other way, for example, by means of welding instead of by means of an adhesive bonding.

Instead of the heating film 26; 126, a different type of flat electrically operated heating medium may also be use, for example, a heating cloth or a nonwoven heating medium.

The half-shells 25 may have a different type of sealable connection instead of the sealable connection 96. The sealable connection may be non-openable instead of being openable, or at least non-openable without destroying it. For example, the sealable connection may also be implemented by means of adhesive bonding or welding. After connecting the half-shells 25, the heating cage 22 is then affixed to the filter bellows 12 and can no longer be separated therefrom.

The connecting straps 58 of the connecting plug 52 may also be connected to the fastening tongue 48 of the pivot connection 50 in some other way instead of with the help of rivets 60. For example, they may be connected by soldering, clamping or by some other type of mechanically stable and electrically conductive connection.

The connecting plug 52 may also be affixed in a form-fitting and/or force-locking and/or physically-bonded manner in some other way instead of with the latching elements 76 and the corresponding positioning noses 66, for example, by means of adhesive bonding, screw connection or welding its final assembly position.

The connecting end disk 32 and/or the opposing end disk 40 and/or the central supporting pipe 20 and/or the plug housing 54 and/or the cage frame 24 and/or the fixation element 80 may also be made of another type of material, for example, metal instead of being made of a plastic.

Instead of having on the whole approximately the same axial extent as the filter bellows 12, the heating cage 22 and/or the heating film 26; 126 may also extend only partially axially, i.e., over a portion of the axial extent of the filter bellows 12. One end face of the heating cage 22 and/or the heating film 26; 126 may advantageously be in contact with the connecting end disk 32 so that a short electric connection to the connecting plug 52 can be implemented easily there. Alternatively, both end faces of the heating cage 22 and/or of the heating film 26; 126 may each be arranged at an axial distance from the connecting end disk 32 and from the opposing end disk 40.

The connecting plug 52 may also be pivotably connectable to the cage frame 24 by means of the film hinge 46 and the fastening tongue 48 by means of the contact straps 44 with the heating film 26; 126. The contact straps 44 may therefore be designed to be stable and flexible accordingly.

Instead of the connecting plug 52, a different type of connecting element may also be provided. The connecting element may also be situated on a peripheral side of the finished filter element.

The invention claimed is:

1. A filter element of a filter for fluid, comprising
a filter medium formed as a filter medium hollow body which is circumferentially closed about a central element axis of the filter element;
an electric heating jacket arranged on a radially outer periphery of the filter medium hollow body, the electric heating jacket enclosed on at least part of the radially outer periphery of the hollow body and elongated in the direction of the element axis;
a fluid-permeable supporting hollow body formed as a heating cage circumferentially enclosing the radially outer periphery of the filter medium hollow body and extends along a portion of the element axis;
wherein the electric heating jacket is arranged in or arranged on a radially inner side of the fluid-permeable supporting hollow body;
wherein the supporting hollow body has at least two supporting body shells, each forming a separate portion of a radially outer circumference of the supporting hollow body, the at least two supporting body shells closable together and engage together, so as to circumferentially close the supporting hollow body about the radially outer periphery of the filter medium hollow body;
wherein the at least two supporting body shells, when closed together, are detachably engaged such that the fluid-permeable supporting hollow body can later be opened for removal or replacement of the filter medium hollow body or the electric heating jacket, and then the at least two supporting body shells closed together and engaged together to circumferentially close about the radially outer periphery of the filter medium hollow body.

2. The filter element according to claim 1, wherein
the heating jacket is connected to an electrical connecting plug having a plug housing and contact pins therein for connection to electric lines to supply power to the electric heating jacket.

3. The filter element according to claim 1, wherein
the heating jacket is arranged between a peripheral side of the filter element hollow body and a peripheral side of the supporting hollow body.

4. The filter element according claim 1, wherein
the at least two supporting body shells are connected to one another by a flexible hinge member.

5. The filter element according to claim 4, wherein
the at least two supporting body shells are connected to one another by means of at least one connection which is initially open and can be closed for closing the supporting hollow body on the periphery.

6. The filter element according to claim 1, wherein
the at least two supporting body shells are joined to one another by a pivotable or movable connection on a peripheral side and the supporting body shells can be pivoted toward one another about the pivotable or movable connection to peripherally enclose the supporting hollow body.

7. The filter element according to claim 6, wherein
the heating jacket has at least two jacket sections, each of the at least two jacket section extending over a portion of the periphery and each being arranged in or directly on a corresponding supporting body shell, such that the at least two jacket sections of the heating jacket can open and close with the at least two supporting body shells.

8. A heating cage for at least partially peripheral and at least partially axial enclosure of a filter medium of a filter element, comprising
a fluid-permeable supporting hollow body;
a circumferentially closable electric heating jacket for circumferentially surrounding and at least partially axially enclosing a filter medium hollow body of a filter element;
wherein the electric heating jacket is arranged on a radially inner side of the fluid-permeable supporting hollow body of the heating cage;
wherein the supporting hollow body has at least two supporting body shells, each forming a separate portion of a radially outer circumference of the supporting hollow body, the at least two supporting body shells closing together and engaging together, so as to circumferentially close about the supporting hollow body;
wherein the at least two supporting body shells, when closed together, are detachably engaged such that the fluid-permeable supporting hollow body can later be opened for removal or replacement of the filter medium hollow body or the electric heating jacket, and then the at least two supporting body shells closed together and engaged together to circumferentially close over the filter medium hollow body.

9. The heating cage according to claim 8, wherein
the supporting hollow body has at least two supporting body shells, each of the at least two supporting body shells extending circumferentially over at least a portion of the radial outer periphery of the supporting hollow body;
wherein the at least two supporting body shells are connected to one another by a pivotable or movable connection on a peripheral side, and the supporting body shells can be pivoted toward one another about the pivotable or movable connection to peripherally enclose the supporting hollow body.

* * * * *